March 17, 1964

B. D. FOWLER 3,125,069

HUMMINGBIRD FEEDING DEVICE

Filed Oct. 29, 1962

BRUCE D. FOWLER
*INVENTOR.*

BY Clarence M. Tuck

ATTORNEY

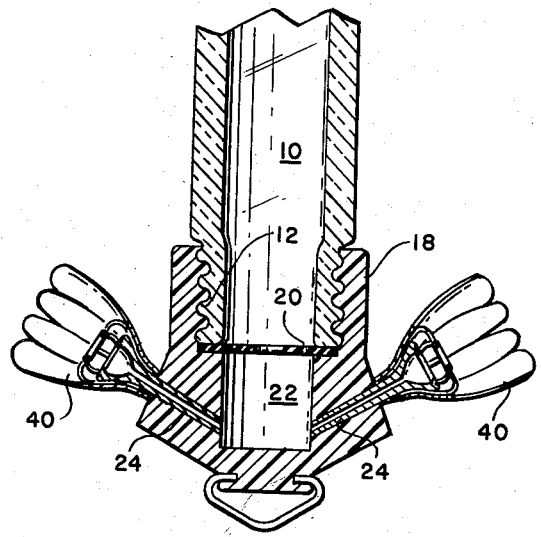
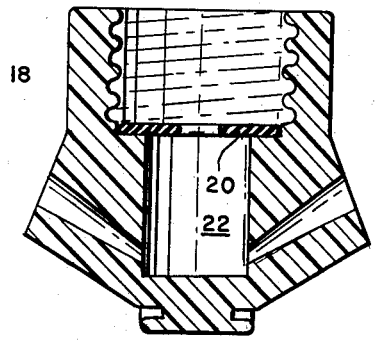
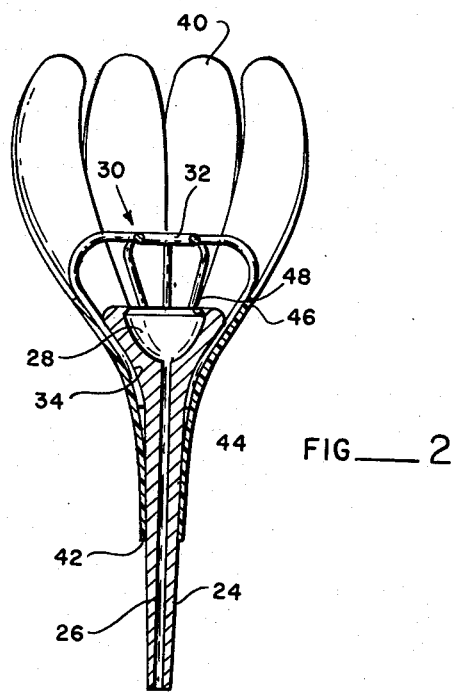
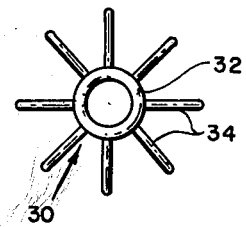

United States Patent Office 3,125,069
Patented Mar. 17, 1964

3,125,069
HUMMINGBIRD FEEDING DEVICE
Bruce D. Fowler, 1714 S. 3rd St., Mount Vernon, Wash.
Filed Oct. 29, 1962, Ser. No. 233,557
4 Claims. (Cl. 119—51)

This present invention relates to the general art of hanging bird feeding devices and more particularly to a feeding arrangement that is particularly adaptable to humming birds but which denies access to the source of food to their natural enemies. This result is achieved by proportioning the food passageways and the guard and shield devices so that they are small enough to deny access to the food supply to other birds, ants and bees. The hummingbird, however, because of its maneuverability and its very long slender beak, has no difficulty feeding from this device.

A large number of bird feeding devices are available and a very appreciable number of these have been studied in detail with the thought of converting them or making use of the principles employed therein in a device particularly intended for hummingbird feeding. However, the natural feeding enemies of the hummingbird are bees and ants, particularly, and none of the devices observed adequately protect the food source and the feeding cup used by the hummingbird from these other pests.

A principal object of this present invention, therefore, is to provide a container for liquid food which is of adequate size and is equipped with feeding devices so that it can be expected to operate for many days without further attention.

A further object of this invention is to provide a feeding cup into which the food tends to flow and which cup is shrouded in guard means which can be colored as desired so as to give the appearance of a flower and at the same time is of sufficient size and peculiar placement as to insure that other small birds cannot partake of the food intended for the hummingbird.

A further object of this invention is to provide a close-in shield to be made of plastic, or preferably of wire, in which the openings provided are adequate for the hummingbird's feeding but are too small to permit ants and bees to get close enough to the feeding cup to partake of the food therein.

Further objects, advantages and capabilities will be apparent from the disclosure in the drawings or may be comprehended or are inherent in the device.

In the drawings:

FIGURE 2 is a vertical sectional view which shows the feeding tube and the shield and guard means on a much increased scale so as to more clearly show the size relationship of the various parts making up this very critical element of the feeding device.

FIGURE 3 is a top plan view of the bee and ant shield device, again on a very much enlarged scale.

FIGURE 4 is a vertical sectional view showing the lower portion of the liquid food container, the dispensing housing and the manner in which the feeding tubes are associated therewith.

FIGURE 5 is an enlarged, cross-sectional view in elevation showing details of structure of one preferred form of the dispensing housing.

Figure 1:
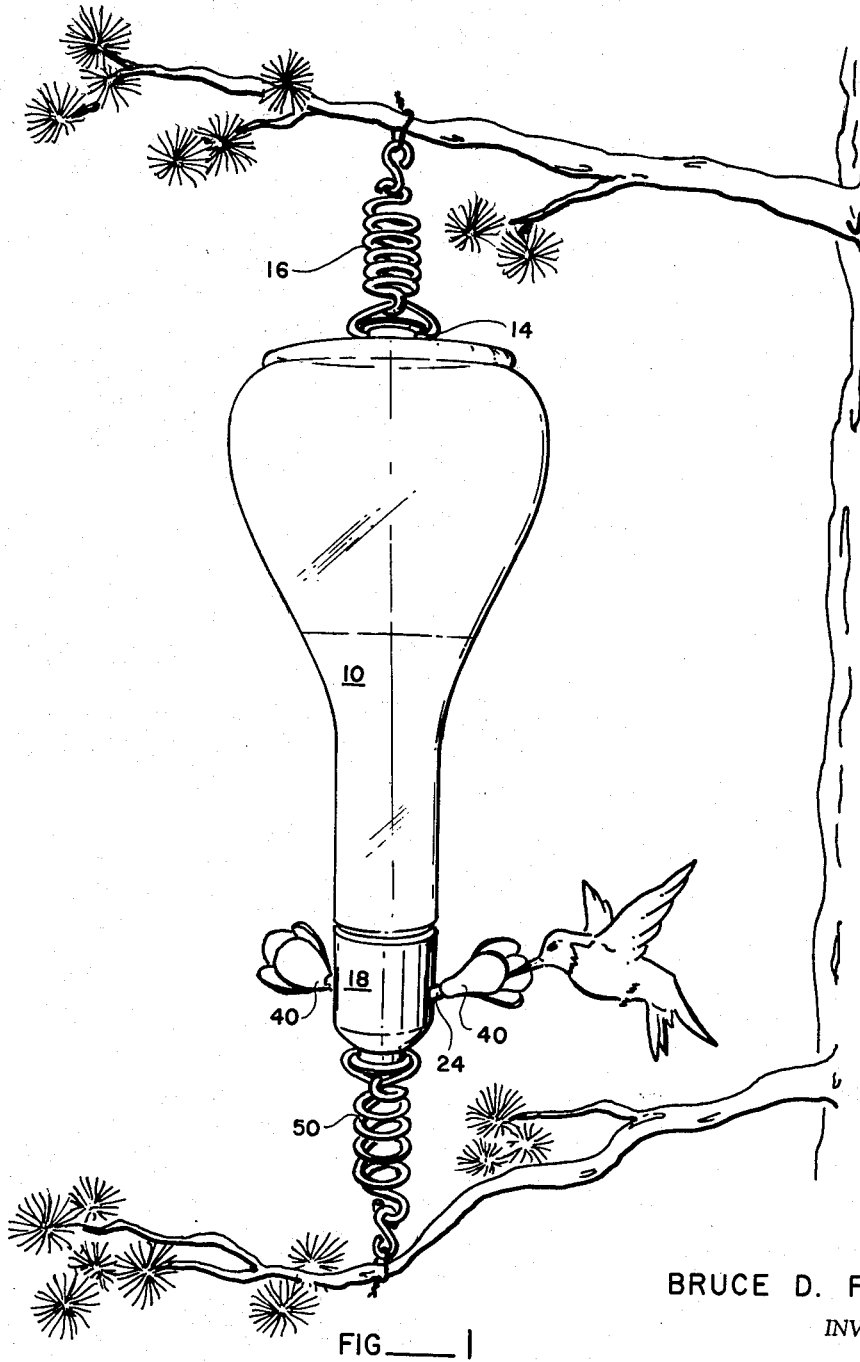
FIGURE 1 is a general view in elevation illustrating one form of my feeding device and showing how it may be supported from any overhead support means.

Referring to the drawings, throughout which like reference characters indicate like parts, the numeral 10 designates the liquid food container which may be made in a large number of styles and sizes and of a different material. It is preferred however that a special bottle be provided so that at one end there will be the threaded neck portion 12 and at the other end a boss or other means 14 so that a supporting means as the spring 16 may be easily attached and yet be also easily detached. It is preferable that the container be transparent, made either of plastic or glass, so that the level of the food remaining in the bottle can be readily observable at all times. Referring to FIGURE 4 there is shown in vertical sectional view, the lower end of the liquid food container 10, and shown engaged in the dispensing housing 18. A gasket is provided at 20 to insure an air-tight juncture between bottle 10 and the dispensing housing 18. The dispensing housing is provided with an interior cavity 22, usually about the size of the opening into container 10, so that a sizable amount of liquid will at all times be present, thus tending to prevent any crystallization of the food present in the container.

Substantially radially disposed about the dispensing housing 18 are a plurality of feeding tubes 24. The feeding tubes are of a size closely resembling that of the ordinary plastic golf tee and this relationship will offer a fair measure of the general size of the associated parts of this invention. The exterior of the feeding tube 24 is preferably tapered as this provides a convenient way of having the same seated and held within the dispensing housing, after the showing of FIGURE 4, and also provides a means for holding the bee and ant shield, as well as the plurality of guard petals 40, in their proper positions. Both of these elements are given lower portions which are tapered, and when the feeding tube is centered therein, after the showing of FIGURE 1, the whole assembly is securely held together with the lower end of the guard petals 42 forming the stop for the feeding tubes as they are inserted into the tapering openings 43 in housing 18, as in FIGURE 4. This is desirable in order to insure that the feeding cup 28 will be disposed at substantially the same level for all the feeding tubes, of which any reasonable number may be employed.

The bee or ant shield member 30 is shown on an exaggerated scale in all the views, FIGURE 4 coming the closest to the actual size. One convenient way of forming the bee and ant shield 30 is to employ a central ring 32 and to have secured to it a plurality of depending fingers 34. Resilient wire appears to be the best material for forming this shield; however, experiments with some of the newer plastics indicate that they can be depended upon to give a continuity or continued gripping effect which is very desirable.

Surrounding the bee and ant shield 30 are the guard petals 40. This assembly may take on various proportions and sizes, the intention of the same being to offer no obstruction to the hummingbird while still preventing many of the lonk beaked small birds from making use of the feeder. Plastic material apepars to be the best choice for the petals as this material is non-metallic, is somewhat yieldable if the proper plastic is selected and also can be very easily colored. It is recommended that generally they should be colored to resemble the type of flowers on which the hummingbird commonly feeds in a particular locality. It is believed that this is a worthwhile consideration as it makes it easier for the hummingbird to find the source of food. The guard petals are preferably formed as one unit having the lower tapered portion 44 terminating with the bottom 42. At about the level indicated at 46, the petals are preferably split, as indicated in FIGURE 2, so as to give a more lifelike appearance of a flower when the device is in use.

To use this device, the dispensing housing 18 is unscrewed from the bottle 10 which is provided with a slender neck to give greater freedom for hummingbirds as they are feeding. Depending upon the manner in which the bottle is supported, the supporting spring 16 may be removed from the support or from the means employed to provide the supporting means for the bottle. This is illustrated in one form in FIGURE 1. In any event it is necessary to invert bottle 10, which should be sealed at the normal bottom of the bottle, as in use this becomes the top, for purposes that will be explained. When an appropriate amount of the liquid food is placed in container 10, the dispensing housing is secured to the bottle as by the threads indicated at 12 so that an air-tight connection is made. To facilitate this, gasket 20 is provided. It is desirable to stress that the joint should be air-tight because this whole device functions to a degree as does the well-known chicken watering device which depends on a partial vacuum in the upper portion of the bottle to prevent the actual weight of the liquid from forcing it out the small feeding tubes 24 except in a slow manner desired. It is usually best to run a wire up through the passageways 26 of each of the feeding tubes to clean out any of the crystallized sugars or other portions of the food solution employed each time container 10 is recharged.

The actual size of passageways 26 depends to a degree on the type of food dispensed and it is for this reason that it is very desirable to have an arrangement such as is shown wherein the feeding tubes can be quickly taken out of the dispensing housing 18 for exchange if necessary for others of a different bore diameter. The normal range of bore diameters for the more common foods employed in feeding hummingbirds is .016 to .047 inch. This is a relatively small bore and in an optimum arrangement it is desirable to have the feeding tubes slanting upwardly toward the outside as is illustrated in FIGURE 4 so that we may have two forces engaged in bringing the food up to the liquid collecting cup 28. On one hand we have the weight of the liquid in the container 10. However, this weight is partially offset by the vacuum created in the top of the bottle. We also have capillary attraction which in some of the feeding fluids provides a very dependable means of moving the liquid. With the annular rim shown at 48 and with the conical portion of the collecting cup 28 substantially horizontal when in use, a seal is provided for the upper end of tube 26 which, when the humming bird is feeding, is broken so that normally the hummingbird will feed down into tube 26 sufficiently so that between feedings the hydro-static balance is upset and air will be taken in through this tube to relieve the partial vacuum to a degree in the upper part of bottle 10 and allow more of the feeding liquid to flow into tube 26 for further feeding. It is difficult to in any way prescribe the diameter of passageway 26 that will normally take a given food because this will vary in use, and it is believed that only by having feeding tubes of different passageway diameters which can be substituted one for another, can the right proportion be secured.

Referring to FIGURE 1, the bottle 10 is supported preferably by a resiliently supported means as 16 and this is usually sufficient in any protected spot, such as under the over-hang of a roof, around a porch, or in similar locations. However, if the device is to be placed in a tree, close to a window so that the feeding may be observed, and this is of considerable interest especially to children, it then becomes desirable to have a hold-down means 50, illustrated in FIGURE 1. This is preferably a spring and tends to position the bottom of the bottle and the feeding means so that it is kept reasonably in position as a convenience to the birds using it.

It is believed that it will be clearly apparent from the above description and the disclosure in the drawings that the invention comprehends a novel construction of a hummingbird feeding device.

Having thus described my invention,

I claim:

1. A hummingbird feeding device, comprising:
    (a) a dispensing housing having means for engaging a liquid food container in a leak-proof manner and communicating with the interior of said liquid food container;
    (b) a liquid food container of vertically elongated form and having means on its upper end, as used, for engaging supporting means;
    (c) said dispensing housing further having a plurality of substantially radially disposed holes slanting upwardly from the interior of said housing to the exterior thereof;
    (d) feeding tubes secured in said radially disposed holes, said tubes having a small diameter liquid conveying passageway terminating in a substantially conical liquid collecting cup;
    (e) an ant shield having a plurality of slender wire-like members enclosing the said liquid collecting cup and spaced apart an amount allowing the passage of a hummingbird's beak but denying the passage of ants and
    (f) supporting means secured to the upper end of said food container.

2. A hummingbird feeding device, comprising:
    (a) a dispensing housing having means for engaging a liquid food container in a leak-proof manner and communicating with the interior of said liquid food container;
    (g) a liquid food container of vertically elongated bottle form and having a small diameter neck portion and means on its upper end, as used, for engaging supporting means;
    (h) said dispensing housing further having a plurality of substantially radially disposed holes slanting upwardly from the interior of said housing to the exterior thereof and tapering with the large diameter end uppermost;
    (d) feeding tubes secured in said radially disposed holes, said tubes having a small diameter liquid conveying passageway terminating in a substantially conical liquid collecting cup;
    (i) an insect shield having a plurality of slender wire-like members enclosing the said liquid collecting cup and spaced apart an amount allowing the passage of a hummingbird's beak but denying the passage of insects and a plurality of guard petals disposed outside of said insects shield and extending axially therefrom to form a guard against the entrance of the beak of other birds; and
    (f) supporting means secured to the upper end of said food container.

3. A hummingbird feeding device, comprising:
    (a) a dispensing housing having means for engaging a liquid food container in a leak-proof manner and communicating with the interior of said liquid food container;
    (b) a liquid food container of vertically elongated form and having means on its upper end, as used, for engaging supporting means;
    (c) said dispensing housing further having a plurality of substantially radially disposed holes slanting upwardly from the interior of said housing to the exterior thereof;
    (j) feeding tubes secured in said radially disposed holes, said tubes having a small diameter liquid conveying passageway terminating in a substantially conical liquid collecting cup having an inwardly directed peripheral rim;
    (i) an insect shield having a plurality of slender wire-like members enclosing the said liquid collecting cup and spaced apart an amount allowing the passage of a hummingbird's beak but denying the passage of insects and a plurality of guard petals disposed outside of said insects shield and extending axially therefrom to form a guard against the entrance of the beak of other birds and
    (k) resilient supporting means secured to the upper end of said food container and resilient positioning hold-down means secured to the lower end of said housing.

4. A hummingbird feeding device, comprising:
(a) a dispensing housing having means for engaging a liquid food container in a leak-proof manner and communicating with the interior of said liquid food container;
(b) a liquid food container of vertically elongated form and having means on its upper end, as used, for engaging supporting means;
(c) said dispensing housing further having a plurality of substantially radially disposed holes slanting upwardly from the interior of said housing to the exterior thereof;
(l) a plurality of feeding tubes removably secured in said radially disposed holes, said plurality of tubes each having a small diameter liquid conveying passageway of the same size, terminating in a substantially conical liquid collecting cup;
(e) an ant shield having a plurality of slender wire-like members enclosing the said liquid collecting cup and spaced apart an amount allowing the passage of a hummingbird's beak but denying the passage of ants and a plurality of guard petals disposed outside of said ant shield and extending axially therefrom to form a guard against the entrance of the beak of other birds; and
(f) supporting means secured to the upper end of said food container.

References Cited in the file of this patent
UNITED STATES PATENTS

| | | |
|---|---|---|
| 586,878 | Stewart | July 20, 1897 |
| 975,607 | Duncan | Nov. 15, 1910 |
| 1,192,487 | Zok | July 25, 1916 |
| 1,986,811 | Hanna | Jan. 8, 1935 |
| 2,267,883 | Wood | Dec. 30, 1941 |
| 2,779,311 | Hamilton | Jan. 29, 1957 |

OTHER REFERENCES

Popular Mechanics Magazine, December 1946, pages 123 to 126.